United States Patent [19]

Greenham et al.

[11] 4,110,871
[45] Sep. 5, 1978

[54] CORE EXCHANGING STUFFING HORN

[75] Inventors: Joseph G. Greenham, Willowdale; Sanford A. B. Moore, Brampton, both of Canada

[73] Assignee: Devro, Inc., Somerville, N.J.

[21] Appl. No.: 734,226

[22] Filed: Oct. 20, 1976

[30] Foreign Application Priority Data

Oct. 20, 1975 [CA] Canada ................................. 237988

[51] Int. Cl.² ........................................... A22C 11/00
[52] U.S. Cl. ..................................................... 17/33
[58] Field of Search ................................ 17/41, 35, 33

[56] References Cited

U.S. PATENT DOCUMENTS

| 2,575,467 | 11/1951 | Reichel et al. | 17/33 |
| 3,115,668 | 12/1963 | Townsend | 17/33 |

Primary Examiner—Robert Peshock
Attorney, Agent, or Firm—Richard J. Rodrick

[57] ABSTRACT

An improved sausage stuffing horn for use in packing stuffing materials and emulsions into sausage casings. The improvement lies in the inclusion of a fixed deflecting member in the channel connecting the intake and discharge openings of the horn. The inner portion of sausage stuffing material in the confined channel flows against the deflecting member, and exchanges the inner portion of stuffing material with the outer portion of stuffing material.

6 Claims, 6 Drawing Figures

CORE EXCHANGING STUFFING HORN

BACKGROUND OF THE INVENTION

This invention relates to sausage stuffing horns commonly used in the packing of emulsions into sausage casings. More particularly, this invention relates to stuffing horns which invert and exchange the core or center portion of the stuffing material in order to improve the quality of the encased product and to improve the efficiency and economy of the sausage stuffing operation.

Stuffing horns are used on a stuffer apparatus which injects an emulsion of meat, fish, vegetable, protein or like material into casings. The resultant filled casings may then be further processed on linking equipment into sausages, e.g., fresh pork sausages, frankfurters, smoked sausage, etc. The casings, for example, Collagen casings of 25-100 foot (7.62-30.5 meter) lengths which have been shirred so that each casing strand has been compressed to a length of about 6-12 inches (15.2-30.5 cm.), are generally placed over the discharge end of the stuffing horn and receive the stuffing emulsion as it is fed from the apparatus through the stuffing horn. A number of problems exist, however, when the known stuffing horns are used.

The appearance, color and cooking performance especially of encased sausage meats are affected by the stuffing horn used in the packing operation. When travelling from the intake opening of the stuffing horn through the body and towards the discharge opening, the fatty portion of the meat emulsion tends to migrate toward the walls of the stuffing horn. When stuffed into the casing the fatty portion of meat settles at the inside surface of the sausage casing. The fatty portion of meat at the surface of the casing detracts from the appearance of the encased product since the color of the fatty emulsion has a smeared appearance rather than the bright, colorful appearance of the rich portion of the emulsion.

Besides an unattractive appearance, excess fat on the surface of the encased product detracts from the juiciness of the product since the juices inherent in the fat located at the outside surface of the casing are driven out during cooking.

It is believed that the smeared, fatty portion of meat is brought to the surface of the casing when the stuffing horn is too long or when the emulsion is driven too rapidly through the known types of stuffing horns. In order to eliminate the smearing and fat migrating problem, the stuffing horn has had to be relatively short, generally less than 9 inches, (22.9 cm.), or the speed of emulsion flow limited so as to prevent the fat from migrating outwardly.

When using the short stuffing horns the size of the shirred casing slug must be commensurate in length. The packed sausage casing is therefore shorter, with more changes and replacing of casings slugs occurring during the production operation. These changes, of course, undesirably slow down the packing process so that productivity rates decline and suffer.

Longer stuffing horns allow longer shirred casing slugs to be used and reduce the number of changes of slugs during packing. However, the longer horns, greater than 9 inches, (22.9 cm.), do not produce the same quality sausage as the shorter horns do to increased smearing of the emulsion at the surface of the encased emulsion.

Steps such as increasing the speed of stuffing the meat emulsion have been attempted, especially when using shorter horns, but to no effective avail. It has been determined that increased stuffing speeds enhance the migration of fatty portions toward the outside of the casings, resulting in an excessively smeared sausage. Consequently, a limiting compromise among length of stuffing horns, length of shirred casing slugs and speed of stuffing operation is practiced in the industry in order to maintain acceptable quality of the stuffed sausages.

There has been at least one attempt to overcome the problem of fat migrating to the surface of meat casings during the packing procedure. For example, U.S. Pat. No. 3,774,266 teaches the inclusion of a mixing gland at the outlet of a conventional stuffing horn. The mixing gland thoroughly mixes the meat emulsion just before being emptied into the casing, so the meat emulsion is sufficiently homogeneous throughout. Although the gland provides a uniform mixture of meat emulsion, its structure and purpose is to mix the meat emulsion uniformly, not to turn it over so that the fatty portion of meat is driven towards the center of the encased meat.

SUMMARY OF THE INVENTION

An improved stuffing horn has now been discovered which overcomes the problem of smearing of meat emulsion during packing by exchanging the outer fatty portions of meat emulsion with the inner, brighter portions of meat emulsion. This new, improved stuffing horn also provides economy, efficiency and increased productivity in the packing of meat emulsions.

Although there may be variations depending on the type of sausages to be packed the sausages produced using the improved stuffing horn generally have a much brighter, richer appearance due to the elimination of the smeared, fatty product at the surface. With the fatty portions contained within the encased meat, cooking of the meat does not drive away the juices in the meat. Hence, the cooked meat is more juicy and often has less weight loss per pound than meat products with excessive surface fat.

The improved sausage stuffing horn can also be made longer than conventional stuffing horns while maintaining the quality and appearance of the encased product. One advantage of longer stuffing horns is the ability to use longer casing slugs. Longer casing slugs do not have to be replaced as often as shorter casings, and provide a greater amount of effective product than shorter casings. When packing the casings, the ends are wasted in the linking, twisting and separating operations. By using longer casings, the yield of effective product is increased since there is less waste per foot of operation, and productivity is raised due to the reduction of changes of casing slugs.

It has also been found that the improved stuffing horn will permit accelerated flow speeds of emulsion through the stuffing horn without sacrificing the quality of the encased product. Such increase in packing speed over the speed in conventional stuffing horns augments the productivity rate of the packing operation, which, in turn, is an economic advantage. It should be appreciated, however, that due to the wide variety of meat emulsions used to make numerous types of sausages, it is possible that not every advantage described will occur simultaneously with each type of meat emulsion.

This invention involves an improvement in a sausage stuffing horn which comprises an elongated body, having in intake opening for receiving stuffing material, a discharge opening for depositing stuffing material into a casing, and a confined channel for passage of flowing stuffing material connecting the intake and discharge openings. Disposed in the confined channel is a fixed deflecting member capable of exchanging the inner portion of stuffing material with the outer portion of stuffing material as the stuffing material in the confined channel flows against the deflecting member.

A preferred embodiment of the improved stuffing horn includes a deflecting member in the shape of a curved moldboard plowshare. This plowshare is located within the channel for the flowing stuffing material is spaced inwardly from the discharge opening, and lies at an angle of about 45° as measured in the direction of flow of stuffing material.

In use the fixed deflecting member in the channel exchanges and inverts the core or center portion of sausage meat emulsion with the meat at the outer edge of the channel. Upon such exchange, the fatty portion is confined substantially to the internal area of the encased meat whereas the external or surface portion is the brighter, less smeared, rich meat emulsion. Beyond better appearance and quality, however, it has been unexpectedly discovered that the sausage produced with the new, improved stuffing horn is more flavorful. It has been theorized that the juices produced by the fatty emulsion remain within the core of the sausage during cooking, thereby not only providing a juicier sausage, but a more tasty and flavorful one as well. This surprising discovery is attributed to the new, improved stuffing horn.

BRIEF DESCRIPTION OF THE DRAWINGS

These advantages and other features of the invention will be more fully described in conjunction with the following drawings wherein.

DETAILED DESCRIPTION OF THE DRAWINGS

Figure 1:
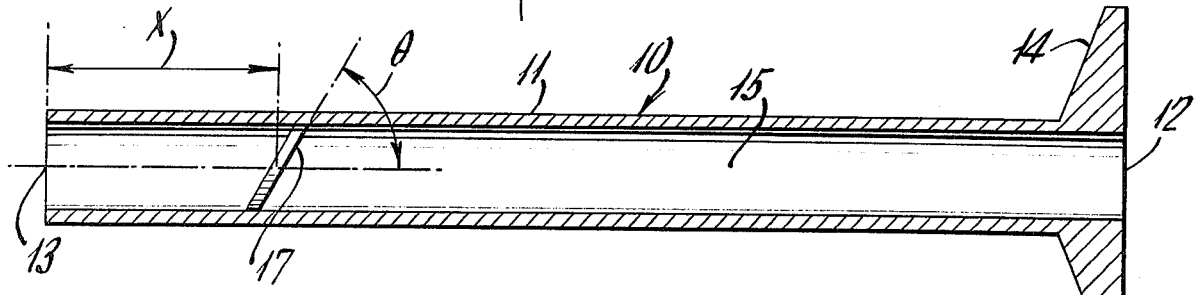
FIG. 1 is a cross-sectional top view of the improved stuffing horn.
Figure 2:
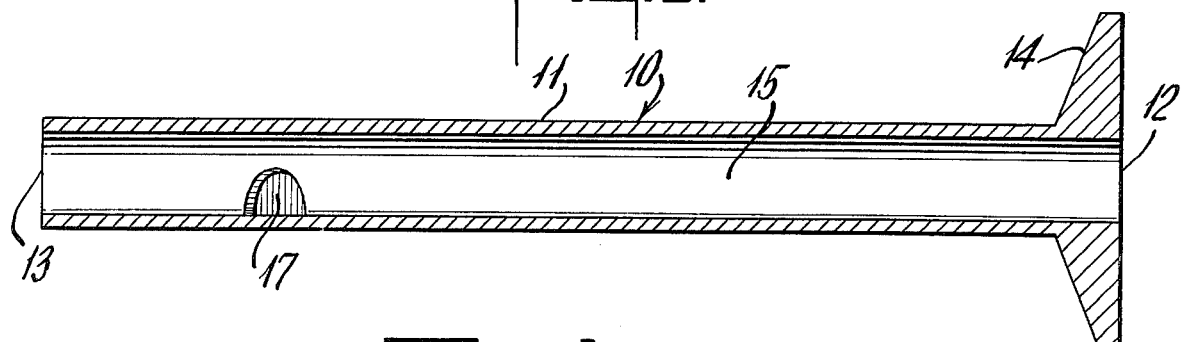
FIG. 2 is a cross-sectional side view, rotated 90° from the view in FIG. 1.
Figure 3:
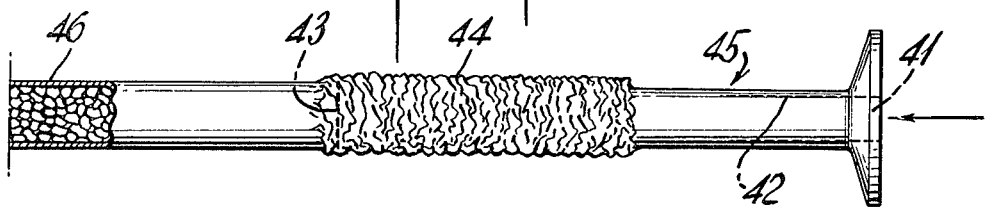
FIG. 3 is a cross-sectional view of the stuffing horn with the casing thereon in a typical packing process.

Referring to FIGS. 1-3, a stuffing horn 10 which is used in the packing of sausage meats and similar emulsions is shown. The stuffing horn 10 has an elongated body 11 and has an intake opening 12 at one end and a discharge opening 13 at the other end. The intake end 12 of the stuffing horn is mounted on an apparatus (not shown) containing a batch of sausage meat emulsion for receiving that emulsion to be packed into a casing. Although the intake end 12 is shown having a flanged end 14 for mounting to the emulsion feeding apparatus, any suitable mounting means may be desirably employed. The discharge opening 13 is the exit for the meat emulsion as it is deposited into a sausage meat casing.

Connecting the intake opening 12 and the discharge opening 13 is a channel 15. The channel 15 is the passageway for the emulsion as it travels from the emulsion feed apparatus through the stuffing horn and into the casing. The channel 15 is confined within the elongated body 11 and is generally cylindrically shaped, as is the body; e.g., a long, narrow tube. However, conically shaped channels and elongated bodies are used quite prevalently with good, satisfactory results. Smooth surface walls surrounding the channel 15 within the elongated body 11 are preferable in order to have a smooth, even flow of meat emulsion therethrough.

A typical sausage packing step is depicted in FIG. 3. The meat emulsion enters an intake end 41, as shown by the arrow, travels through a confined channel 42 and exits out through a discharge opening 43. A shirred sausage casing slug 44 has been slid over the elongated body 45 and is generally in a very compact, squeezed, corrugated condition. For example, a 50 foot (15.2 meter) sausage casing, before being packed, can fit on a 7 inch (17.8 cm.) stuffing horn in its shirred state. As the meat emulsion exits from the discharge end 43, it fills out the casing 46 and the force of the moving emulsion stretches the casing 46 into a smoothly packed meat product.

To achieve the improvements described above, a deflecting member 17 is fixedly placed in the channel 15 as seen in FIGS. 1 and 2. The deflecting member 17 deflects the travelling sausage meat emulsion so that the core or center portion of meat is directed towards the walls of the channel 15. This deflection causes the inner or center portion of meat emulsion to be inverted or exchanged with the outer portions of meat emulsion as the emulsion in the channel 15 flows against the deflecting member 17 located therein.

In the embodiment of the invention shown in FIGS. 1-3, the deflecting memebr 17 has an angular orientation within the channel in order to cause a deflection necessary for emulsion exchange. The angle $\theta$ as shown in the drawings may suitably lie between 5° and 85°, and preferably between 35° and 55°, as measured in the direction of flow of stuffing material to effectuate the deflection and meat emulsion exchange. Depending upon such factors as the viscosity of the meat emulsion and the speed of flow through the channel, the angle $\theta$ may be varied over the wide range listed above to produce satisfactory results.

The deflecting member 17 in the embodiment being described is located in the channel 15 so that it is spaced inwardly, dimension "X", from the discharge end 13. As seen in the drawings, the spacing is measured along the center line of the channel 15 from the discharge opening 13 to the deflecting member 17. The spacing "X" from the discharge opening 13 is a variable, dependent upon the texture, viscosity, temperature and speed of the emulsion. The setting of the deflecting member 17 may be fixed in the confined channel 15 so that the leading edge of the deflecting member 17 extends beyond the discharge opening, lies just at the discharge opening or is located entirely within the channel by as much as 20 inches (50.8 cm.) from the discharge opening 13 on longer stuffing horns to yield a product maintaining accepted quality values.

The texture, viscosity, temperature and speed of the meat emulsion also control the shape and size of the deflecting member 17. There must be sufficient size of the fixed deflecting member 17 in the channel 15 to cause a deflection of meat to exchange the core with the outer portion of meat. Accordingly, the size of the deflecting member may constrict the channel cross-sectional area by as little as 15 percent or as much as 70 percent, depending upon the variables mentioned above.

The shape of the deflecting member 17 may also be varied in accordance with the meat emulsion. The deflecting member may be semi-circular, triangular, segmented, rectangular or other desired shapes in order to produce the beneficial results explained above.

Figure 4:
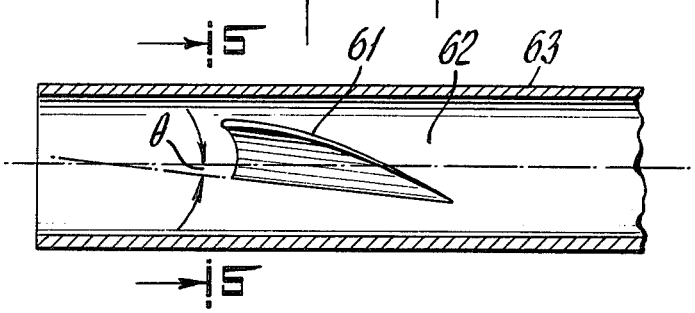
FIG. 4 is a cross-sectional top view of another embodiment of the improved stuffing horn.
Figure 6:
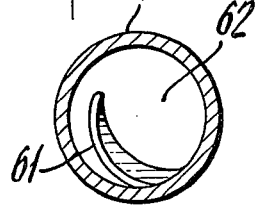
FIG. 6 is an enlarged cut away view of the deflecting member taken along line A—A of FIG. 4.
Figure 5:
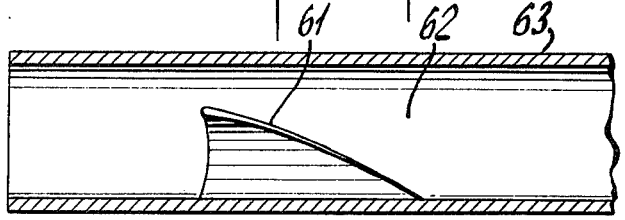
FIG. 5 is a cross-sectional side view, rotated 90° from the view in FIG. 4.

One preferred shape which has produced exceptional results is a deflecting member resembling a moldboard plowshare as seen in FIGS. 4-6. This plowshare member 61 has the appearance of a thin, curved blade which forces the center portion of sausage stuffing emulsion to one side as the emulsion advances. Essentially, the plowshare blade 61 is a curved, thin triangular shaped member and is placed within the channel 62 of the elongated body 63 to deflect the core of the meat emulsion to the walls of the channel 62. To assure effective deflection and adequate exhange of the core with the outer portion of meat emulsion the plowshare 61 is preferably placed in angular orientation 0 within the channel 62. Angles between 5° and 85° and preferably between 35° and 55° as measured in the direction of flow of stuffing material provide satisfactory results.

It has also been determined that more than one deflecting surface may be positioned within the channel of the stuffing horn to produce an encased meat with the desirable features contemplated by this invention.

It has been found desirable in certain embodiments of this invention to position the deflecting member within the channel so that it is inclined in the direction of the discharge opening. This inclination is helpful when the particle sizes within the emulsion are comparatively large so as to prevent the particles from lodging behind the deflecting member during the meat packing. Again, the texture, viscosity, temperature and speed of the meat emulsion will dictate whether the deflecting member need be inclined to provide an effective operation.

The invention will be further illustrated in greater detail by the following specific examples, given primarily for the purposes of illustration.

EXAMPLE I

A cylindrically shaped, tubular stuffing horn is used in the packing of sausages. The sausage meat emulsion to be encased contains approximately 38% fat, 44% moisture and 9% protein, and is delivered from a Warrick Stuffer pump through the stuffing horn at a temperature of 32° F (0° C). The stuffing horn has a length of 13 inches (33 cm.) and an inside diameter of 0.55 inches (1.40 cm.). A deflecting surface in the shape of a curved, moldboard plowshare (or curved triangle) is inserted in the channel of the stuffing horn so that its centerline is approximately 2¼ inches (5.72 cm.) from the discharge opening of the stuffing horn. The plowshare is ½ inch (1.27 cm.) in length and is positioned at an angle of about 45° across the direction of flow of meat emulsion. The size of the plowshare deflecting surface constricts the diameter of the channel by about 50 percent at the deflection point. The emulsion is permitted to flow through this stuffing horn at a rate of approximately 140 feet/minute (42.4 meters/min.).

The sausage packed with this stuffing horn has the bright, rich appearance of non-smeared meat. Upon cooking, it was found that this sausage had about a 4 percent less weight loss than comparable sausages produced using conventional stuffing horns without deflecting members.

EXAMPLE II

The same meat emulsion is used as prepared in Example I. As a control test, the stuffing horn is equivalent to the stuffing horn used in Example I with the exception that no deflecting surface is located within the channel. When stuffing the same sausage meat emulsion into the casing surface smearing causes the encased product to be less bright and less definitive in emulsion particle size than Example I. However, the appearance of encased produce similar to that in Example I is achieved by lowering the flow pressure and ensuing speed of flow by approximately 30 feet/minute (9.15 meters/min.).

Although the present invention has been described and illustrated with reference to preferred embodiments thereof, it is to be appreciated that such is merely for the purpose of disclosing the invention and is not to be construed as limitative of the broader aspects of the described inventive concept.

What is claimed is:

1. An improved sausage stuffing horn comprising an elongated body having an intake opening, a discharge opening and a confined channel for passage of flowing stuffing material connecting said openings; and a fixed deflecting member located in the confined channel but spaced inwardly from said discharge opening and lying at an angle between 5° and 85° as measured in the direction of flow of stuffing material, said deflecting member being capable of exchanging the inner portion of stuffing material with the outer portion of stuffing material as said stuffing material in the channel flows against said deflecting member.

2. An improved sausage stuffing horn as defined in claim 1 wherein the deflecting member is in the shape of a curved moldboard plowshare.

3. An improved sausage stuffing horn as defined in claim 1 wherein the angular orientation of the deflecting member is between 35° and 55°.

4. An improved sausage stuffing horn as defined in claim 5 wherein the angular orientation of the plowshare is between 35° and 55°.

5. An improved sausage stuffing horn as defined in claim 1 wherein the deflecting member is inclined in the direction of the discharge opening.

6. An improved sausage stuffing horn as defined in claim 1 wherein there is a plurality of deflecting members.

* * * * *

UNITED STATES PATENT AND TRADEMARK OFFICE
CERTIFICATE OF CORRECTION

PATENT NO. : 4,110,871

DATED : September 5, 1978

INVENTOR(S) : Joseph G. Creenham and Sanford A.B. Moore

It is certified that error appears in the above-identified patent and that said Letters Patent are hereby corrected as shown below:

In Column 6, line 50, "claim 5" should read ---claim 2---

Signed and Sealed this

Twenty-fourth Day of April 1979

[SEAL]

Attest:

RUTH C. MASON
*Attesting Officer*

DONALD W. BANNER
*Commissioner of Patents and Trademarks*